Patented June 26, 1934

1,964,191

UNITED STATES PATENT OFFICE 1,964,191

RECOVERY PROCESS

Leonard E. Branchen, Rochester, N. Y., assignor of one-half to Carbide & Carbon Chemicals Corporation and one-half to Eastman Kodak Company, corporations of New York No Drawing. Application May 24, 1932, Serial No. 613,335

15 Claims. (Cl. 252—1)

The invention pertains to a method of separating and recovering certain of the valuable components entering into the manufacture of composite materials comprising base sheets or films composed essentially of cellulose organic esters coated with moistureproofing compositions containing vinyl resins. More particularly the invention provides a method of recovering the cellulose organic esters from such material in sufficiently pure form to permit their reuse in the manufacture of clear, transparent sheets or films for photographic and other purposes.

Although not limited thereto, the invention is especially advantageous in the treatment of defective and scrap material produced in the manufacture of a new and improved type of composite moistureproof material. I make no claim to the sheeting itself or its manufacture, inasmuch as this material was invented by Charles R. Fordyce and Harold F. Robertson. This material is prepared by providing a sheet or a cellulose organic ester, such as cellulose acetate, cellulose propionate, cellulose butyrate, or mixed esters, such as cellulose acetate propionate, cellulose acetate butyrate or cellulose acetate stearate, with a thin coating upon a surface or surfaces thereof of a moistureproofing composition containing as its principal constituent a vinyl resin, that is, an artificial resinous body resulting from the polymerization of certain vinyl compounds. The coating composition may also contain other resins, gums, waxes, plasticizers, coloring materials, and other ingredients. Various vinyl resins may be prepared by polymerizing vinyl esters. Polymerization products of inorganic vinyl esters, such as the vinyl halides, or those of organic vinyl esters, such as the vinyl esters of aliphatic acids, may be used. In general, vinyl resins resulting from the conjoint polymerization (by which is meant polymerization of a plurality of compounds while in mutual contact) of two or more vinyl esters are preferred for use in making the composite moistureproof material. Vinyl resins having particularly desirable properties may be prepared by the conjoint polymerization of a vinyl halide and a vinyl ester of an aliphatic acid, for example, vinyl chloride and vinyl acetate may be conjointly polymerized in proportions ranging from about 70% to 90% by weight of the chloride. A typical vinyl resin having the preferred characteristics may be formed by conjointly polymerizing a mixture of vinyl chloride and vinyl acetate, containing about 80% by weight of the chloride, in the presence of a suitable liquid medium, such as the aliphatic alcohols, ketones, and paraffin hydrocarbons, and in the presence of a suitable polymerizing catalyst, such as dibenzoyl peroxide, at a temperature below about 60° C.

In the manufacture and use of the above-described moistureproof material, defective and scrap material may be produced which, were it not for the present invention, would represent a serious loss. It is the principal object of my invention to provide a method for recovering the valuable components of this scrap material. A more specific object is to recover the cellulose organic ester base of the sheet material in a form sufficiently pure to permit its reuse in the manufacture of the moistureproof material, for photographic films or other purposes. Another object is to recover the various components of the moistureproofing composition itself.

These objects are effectively accomplished by the recovery process of my invention. The essential features of my invention comprise either, first, treating the finely divided sheet scrap with a wetting agent and then adding to the mixture a liquid which, under the conditions of operation, will not dissolve cellulose organic esters but which will dissolve the vinyl resin coating composition and its various ingredients; or by merely agitating the finely divided scrap material with a composite solvent mixture which is substantially non-solvent for cellulose organic esters, such as a mixture of propylene dichloride and toluene, or even by treating the scrap with a non-solvent for cellulose organic esters alone. In any case, the liquid used must be one which will not dissolve cellulose organic esters, but which will dissolve the components of the moistureproofing composition.

The moistureproof material usually consists of a thin sheet of a cellulose organic ester, such as cellulose acetate, coated on one or both sides with a vinyl resin-containing composition to a thickness of about 0.00005 inches making the total thickness of the moistureproof sheet about 0.001 inches. The coating may have a widely varying composition ranging preferably from about 55% to about 85% by weight of vinyl resin, from about 2% to about 10% by weight of wax, from about 5% to about 20% of a gum, and from 0 to about 25% of a plasticizer. Vinyl resins resulting from the conjoint polymerization of vinyl chloride and vinyl acetate, as described above, are preferred. Suitable waxes are paraffin, ceresin, beeswax, and the like. Paraffin waxes or those waxes containing the higher paraffin hydrocarbons are preferred. Those paraffin waxes having a high melting point, say above about 50° and preferably above 60° C., have been found to be most satisfactory. The gum may be a true gum or a resin, ester gum, and various modifications thereof, certain phenol-formaldehyde resins, particularly the oil-soluble type, and related materials are suitable. Oxidized ester gum is preferred. Plasticizers may include ethyl and butyl phthalate, di(beta-butoxyethyl) phthalate, di(beta-ethoxyethyl) phthalate, cresyl esters, and phenyl esters, such as triphenyl phosphate. Di(beta-butoxyethyl) phthalate is preferred for use in the compositions.

According to a preferred procedure of carrying out my invention, the recovery process is conducted stepwise. The scrap or defective material to be treated is cut into small pieces or otherwise reduced to a finely divided condition, and agitated with an amount of a wetting agent, such as toluene, xylene, or benzene, sufficient to wet completely the surfaces of the small pieces. The principal function of these wetting agents is to separate the individual pieces of the material and thus provide for the ready penetration of a leaching solvent into all portions thereof, and to insure contact of the solvent with the entire surface of all of the material being treated. In the case of the wetting agents above-named, an additional function is also served, namely, to extract most of the wax content of the moistureproofing composition. A leaching solvent is next added to the mass of material. This solvent is selected primarily for its solvent power for vinyl resins. I have found that 1,2 alkylene dichlorides having at least three carbon atoms in the molecule are especially desirable for this purpose. Of these dichlorides, I prefer to use propylene dichloride, $CH_3.CHCl.CH_2Cl$, which is a stable liquid boiling at 96.8° C., and which has a specific gravity of 1.16 at 15° C. Propylene dichloride is an active solvent for vinyl resins, gums and many plasticizing materials, and possesses some solvent power for waxes. Typical of other alkylene dichlorides which may be used instead of propylene dichloride are 1,2 butylene dichloride and 1,2 amylene dichloride. It is essential to have a leaching solvent which is a good solvent for the overcoating composition, but which will not attack the cellulose organic ester of the base sheet. Propylene dichloride is a non-solvent for cellulose acetate, cellulose acetate propionate, and cellulose acetate butyrate at ordinary temperatures but begins to attack these esters at temperatures above about 50° C. When used with cellulose propionate, cellulose butyrate, or cellulose acetate stearate, the leaching solvent should contain not more than about 20% by volume of propylene dichloride to avoid attacking the base sheet excessively. In such case the balance of the liquid may be, preferably, toluene.

After the scrap material has been agitated with the leaching solvent, the solvent is drained off and successive extractions of the material with further portions of the leaching solvent are made. The moistureproofing composition will be completely removed by these treatments, and the pure cellulose organic ester left behind. In this connection it should be noted that plasticizers or modifying agents originally present in the base sheet are also removed by the new process.

The recovered components may be utilized as desired. The purified cellulose organic ester may be dissolved and formed into sheets or films for further use, and the leaching solvent containing the moistureproofing ingredients may be treated for the reuse of these substances, for example, by concentrating the solution and adding the proper components to adjust the composition with respect to mechanical and evaporation losses of any of the constituents.

If desired, the step involving treating the scrap material with wetting agents may be omitted, and the material may be treated directly with the alkylene dichloride leaching solvent which may be the alkylene dichloride alone or which may comprise a mixture containing from about 20% to 95% by volume of the alkylene dichloride together with another liquid, such as toluene, benzene, xylene and the like.

The following examples will serve to illustrate the method of practicing my invention:

I. Scrap moistureproof material 0.001 inches in thickness composed of cellulose acetate coated on both sides with a composition containing 73% by weight of a vinyl resin resulting from the conjoint polymerization of about 80% by weight of vinyl chloride and about 20% by weight of vinyl acetate, 2% by weight of paraffin wax (M. P. 66° C.), 5% by weight of oxidized ester gum, and 20% by weight of di(beta-butoxyethyl) phthalate was cut into small pieces. Ten parts by weight of this material was agitated for about 15 minutes at room temperature with 60 parts by weight of toluene. The toluene was then drained off and 100 parts by weight of propylene dichloride was added to the scrap and agitation continued for 15 minutes. Four more extractions were then made in this manner. After the final treatment, the cellulose acetate scrap was dried and dissolved in acetone. Films made from this solution of recovered cellulose acetate were perfectly clear and transparent. This showed that all of the ingredients of the coating composition had been completely removed, since these ingredients, particularly the vinyl resin and wax, are not compatible with cellulose acetate, and even minute amounts thereof would cause cloudiness in the cellulose acetate films.

II. Scrap moistureproof material 0.001 inches in thickness formed from cellulose acetate coated on both sides with a moistureproofing composition containing 70% by weight of the vinyl resin of Example I, 10% by weight of paraffin wax (M. P. 66° C.), 10% by weight of oxidized ester gum, and 10% by weight of di(beta-butoxyethyl) phthalate was treated exactly as described in Example I with the substitution of 1,2 butylene dichloride for propylene dichloride. The recovery effected was as good as that obtained in the previous example.

III. Scrap moistureproof material 0.001 inches in thickness composed of cellulose acetate coated on both sides with a moistureproofing composition containing 66% by weight of the vinyl resin described in Example I, 4% by weight of paraffin wax (M. P. 66° C.), 15% by weight of oxidized ester gum, and 15% by weight of di(beta-butoxyethyl) phthalate was cut into small pieces. Ten parts by weight of this scrap was agitated for 15 minutes at room temperature with 100 parts by weight of a mixture containing 30% by volume of propylene dichloride and 70% by volume of toluene. Four more extractions were made in this manner. After the final treatment the cellulose acetate was found to be entirely freed from the moistureproofing composition as shown by the appearance of a film obtained from a solution thereof.

The portions of toluene and alkylene dichloride from the operation of the above examples were separately evaporated to recover the dissolved materials contained therein. In the case of the toluene solutions, the solids obtained consisted essentially of wax, the dichloride solutions contained all of the various components of the coating compositions, and when these solutions were evaporated to the proper concentration of solids, and additions made to adjust for mechanical and other losses, they were then used to moistureproof new cellulose acetate sheets and films.

I prefer to conduct my new process at approximately room temperature, and while the temperature may vary considerably as desired it should not be above about 50° C. during the operation of the process when a solvent such as propylene dichloride is being used, since propylene dichloride begins to attack all of the cellulose organic esters at high temperatures.

From the foregoing it will be apparent that I have provided a recovery process which is both simple and effective. By means of my invention an almost quanitative recovery of all of the components entering into the manufacture of moistureproof materials of the class described is possible, and the several ingredients are recovered in a form which admits of their immediate reuse.

I claim:—

1. Process for recovering cellulose organic esters from composite sheet materials composed essentially of cellulose organic esters combined with vinyl resin-containing moistureproofing compositions, which comprises reducing such material to a finely divided condition, contacting said material with a hydrocarbon wetting agent to separate the individual pieces of said material and provide for the ready penetration of a leaching solvent, treating said material with a liquid which is a solvent for said vinyl resin-containing composition and which is a non-solvent for said cellulose organic esters, and thereafter separating the undissolved cellulose organic ester from said vinyl resin-containing composition dissolved in said liquid.

2. Process for recovering cellulose organic esters from composite sheet materials composed essentially of cellulose organic esters combined with vinyl resin-containing moisture-proofing compositions, which comprises treating the composite materials with a liquid which contains a substantial proportion of a 1,2 alkylene dichloride having at least three carbon atoms in the molecule and which is a solvent for said vinyl resin-containing composition and which is a non-solvent for said cellulose organic esters, and thereafter separating the undissolved cellulose organic ester from said vinyl resin-containing composition dissolved in said liquid.

3. Process for recovering cellulose organic esters from composite sheet materials composed essentially of cellulose organic esters combined with vinyl resin-containing moistureproofing compositions, which comprises treating the composite materials with a liquid which contains a substantial proportion of propylene dichloride and which is a solvent for said vinyl resin-containing composition and which is a non-solvent for said cellulose organic esters, and thereafter separating the undissolved cellulose organic ester from said vinyl resin-containing composition dissolved in said liquid.

4. Process for recovering cellulose acetate from composite sheet materials composed essentially of cellulose acetate combined with vinyl resin-containing moistureproofing compositions, which comprises reducing such material to a finely divided condition, contacting said material with a hydrocarbon wetting agent to separate the individual pieces of said material and provide for the ready penetration of a leaching solvent, treating said material with a liquid which is a solvent for said vinyl resin-containing composition and which is a non-solvent for said cellulose acetate, and thereafter separating the undissolved cellulose acetate from said vinyl resin-containing composition dissolved in said liquid.

5. Process of recovering cellulose acetate from composite sheet materials composed essentially of cellulose acetate combined with vinyl resin-containing moistureproofing compositions, which comprises treating the composite materials with a liquid which contains a substantial proportion of propylene dichloride and which is a solvent for said vinyl resin-containing composition and which is a non-solvent for said cellulose acetate, and thereafter separating the undissolved cellulose acetate from said vinyl resin-containing composition dissolved in said liquid.

6. Process for separating and recovering the valuable constituents of composite sheet materials composed essentially of cellulose organic esters combined with vinyl resin-containing moistureproofing compositions, which comprises agitating said composite materials with a liquid containing a hydrocarbon non-solvent for cellulose organic esters and a 1,2 alkylene dichloride having at least three carbon atoms in the molecule, and thereafter separating undissolved cellulose organic esters from the iquid and removing said vinyl resin-containing composition dissolved in said liquid.

7. Process for separating and recovering the valuable constituents of composite sheet materials composed essentially of cellulose organic esters combined with vinyl resin-containing moistureproofing compositions, which comprises agitating said composite materials with a liquid containing toluene and a 1,2 alkylene dichloride having at least three carbon atoms in the molecule, and thereafter separating undissolved cellulose organic esters from the liquid and removing said vinyl resin-containing composition dissolved in said liquid.

8. Process for separating and recovering the valuable constituents of composite sheet materials composed essentially of cellulose organic esters combined with vinyl resin-containing moistureproofing compositions, which comprises agitating said composite materials with a liquid containing toluene and at least about 20% by volume of propylene dichloride, and thereafter separating undissolved cellulose organic esters from the liquid and removing said vinyl resin-containing composition dissolved in said liquid.

9. Process for separating and recovering the valuable constitutents of composite sheet materials composed essentially of cellulose organic esters combined with vinyl resin-containing moistureproofing compositions, which comprises agitating said composite materials at temperatures below about 50° C. with a liquid containing toluene and at least about 20% by volume of propylene dichloride, and thereafter separating undissolved cellulose organic esters from the liquid and removing said vinyl resin-containing composition dissolved in said liquid.

10. Process for separating and recovering the valuable constituents of composite sheet materials composed essentially of cellulose acetate combined with vinyl resin-containing moistureproofing compositions, which comprises agitating said composite materials at temperatures below about 50° C. with a liquid containing toluene and at least about 20% by volume of propylene dichloride, and thereafter separating undissolved cellulose acetate from the liquid and removing said vinyl resin-containing composition dissolved in said liquid.

11. Process for separating and recovering the valuable constituents of composite sheet materials composed essentially of cellulose acetate combined with vinyl resin-containing moistureproofing compositions, which comprises reducing such material to a finely divided condition, treating said material with a hydrocarbon wetting agent to separate the individual pieces of said material and provide for the ready penetration of a leaching solvent, agitating the material so treated with successive portions of a liquid containing propylene dichloride at a temperature below about 50° C., combining the portions of liquid and separating the cellulose acetate therefrom in solid form, and removing the vinyl resin-containing composition in solution in said liquid.

12. Process for separating and recovering wax components contained in vinyl resin and wax-containing moistureproofing compositions combined with cellulose organic ester sheets or films to form composite materials, which comprises agitating the composite material in finely divided form with a hydrocarbon liquid which is a non-solvent for cellulose organic esters but which is a wax solvent, separating the liquid containing dissolved wax from said material, and evaporating said liquid.

13. Process for separating and recovering wax components contained in vinyl resin and wax-containing moistureproofing compositions combined with cellulose organic ester sheets or films to form composite materials, which comprises agitating the composite material in finely divided form with toluene, separating the toluene containing dissolved wax from said material, and evaporating said toluene.

14. Process for separating and recovering wax components contained in vinyl resin and wax-containing moistureproofing compositions combined with cellulose acetate sheets or films to form composite materials, which comprises agitating the composite material in finely divided form with toluene, separating the toluene containing dissolved wax from said material, and evaporating said toluene.

15. Process for separating and recovering the valuable constituents of composite sheet materials composed essentially of cellulose acetate combined with vinyl resin-containing moistureproofing compositions, which comprises reducing such material to a finely divided form, treating said material with toluene to separate the individual pieces of said material and provide for the ready penetration of a leaching solvent, removing the excess of toluene, agitating the toluene-treated material at temperatures below about 50° C. with a liquid containing propylene dichloride and thereafter separating cellulose acetate from the vinyl resin-containing composition dissolved in said liquid.

LEONARD E. BRANCHEN.